March 30, 1965 R. SIEGEMUND 3,176,141
INFORMATION READING CIRCUIT NETWORK
Filed Feb. 24, 1961 2 Sheets-Sheet 1
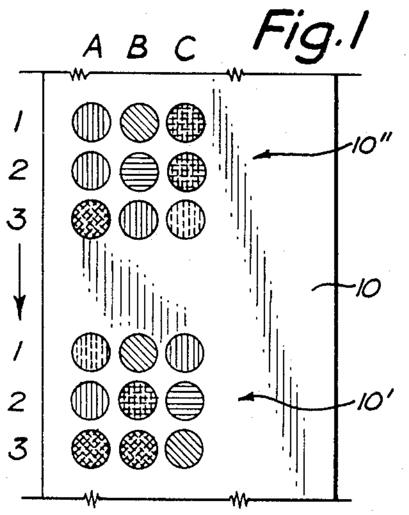
Fig. 1
Fig. 2
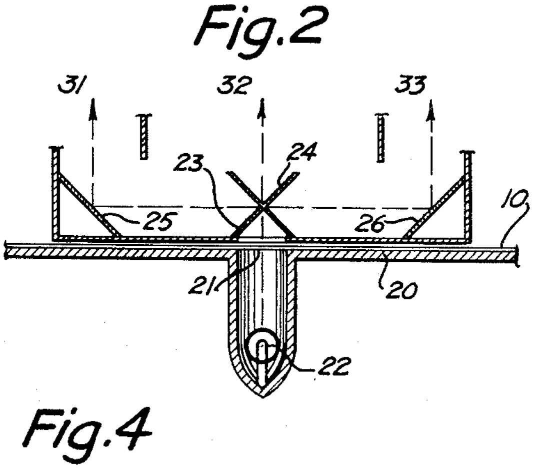
Fig. 4
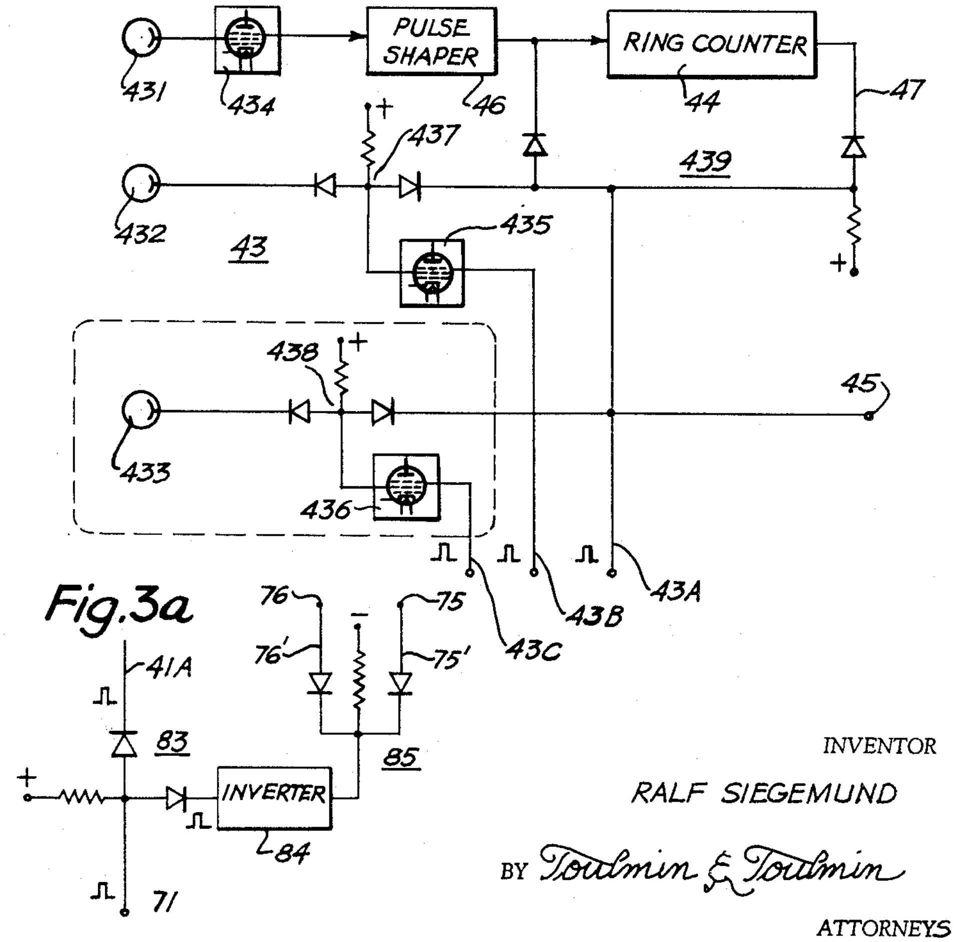
Fig. 3a
INVENTOR
RALF SIEGEMUND
BY Toulmin & Toulmin
ATTORNEYS March 30, 1965 R. SIEGEMUND 3,176,141

INFORMATION READING CIRCUIT NETWORK

Filed Feb. 24, 1961 2 Sheets-Sheet 2

INVENTOR

RALF SIEGEMUND

BY Toulmin & Toulmin

ATTORNEYS 3,176,141
INFORMATION READING CIRCUIT NETWORK
Ralf Siegemund, Arlington, Va., assignor to Commonwealth Engineering Company of Ohio, Dayton, Ohio
Filed Feb. 24, 1961, Ser. No. 91,511
5 Claims. (Cl. 250—219)

Figure 3:
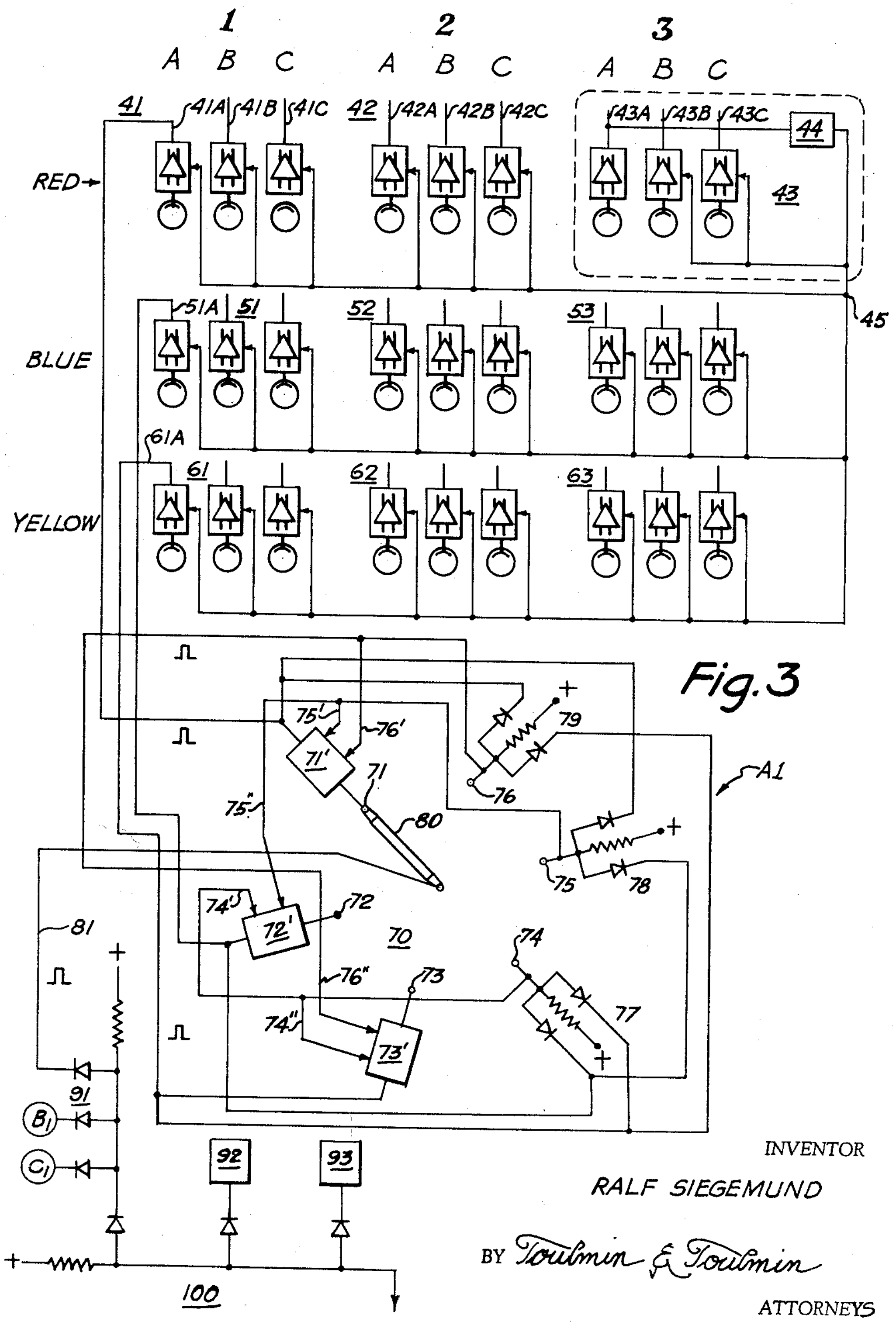

The present invention is related to a circuit network for reading out symbolically recorded information or identification patterns defined by a combination of colored dots selected from a number of predetermined colors.

It is a primary object of the present invention to provide a fast and efficient system of reading out such symbolically recorded information.

It is a primary feature of the present invention to provide a gating circuit being controlled either by the code carrier for momentarily enabling monitoring devices for testing the color of each dot when the dot is in a particular position with respect to the monitoring device whereby the transport or advancement of the carrier is not interrupted.

While the specification concludes with claims particularly pointing out and distinctly claiming the subject matter which is regarded as the invention, it is believed that the invention, the object and feature of the invention and further objects and features and advantages thereof will be better understood from the following description taken in connection with the accompanying drawings in which:

FIGURE 1 is a sample of an information carrier to be employed in an apparatus according to the present invention, FIGURE 2 is a cross-sectional view through a color divider employed in the embodiment of the present invention as illustrated in FIGS. 3 and 4, FIGURE 3 illustrates a coincidence circuit network for monitoring a complete pattern of coded information, FIGURE 3*a* illustrates a detailed portion of the circuit network shown in FIG. 3, FIGURE 4 is a diagrammatic view of the circuit network employed to monitor one row of dots of a pattern on a carrier as illustrated in FIG. 1.

Before turning to the detailed description of the drawing several explanatory remarks are in order. When in the following is mentioned a "gating" circuit and a logic "and" circuit, these circuits can be used exchangeably. They refer to the widely known type of circuit networks in which appearance and production of an output signal depends on, the presence of two or more input signals, however produced, without delay.

A logic "or" circuit is one in which an output is produced whenever at least one input signal is present at a plurality of input terminals thereof. Elements of this type are presently widely known in the art, which holds true also for "ring-counters," "inverters" and "pulse-shapers," and for summary treatment of the subject matter, reference is made, for example, to the book of Richards, Digital Computor-Components and Circuits, Van Nostrand, 1959.

The following description further assumes that photo-electric circuits, particularly photo-electric amplifiers are also widely known in the art, they will be referred to only briefly, and they will be illustrated in block diagram only.

FIGURE 1, as stated above, illustrates a code carrier as advantageously employed in carrying out the present invention. The code carrier of this type was first disclosed in FIG. 2 of the application of Toulmin, Ser. No. 63,204, filed October 17, 1960. This carrier is comprised of a strip of material which in the instant case is assumed to be transparent. This strip is denoted with reference numeral 10 and is moving in the direction of the arrow.

There are provided on this strip, a plurality of colored dots arranged in square patterns. One square pattern being called a frame. In the present case, for reasons of simplification, it is assumed that each pattern includes nine dots arranged in three rows or columns 1, 2 and 3, and three lines, A, B and C. A dot in any pattern is therefor not only characterized by its specific color, but also by a location identification such as A1, B2, etc. For facilitiating the understanding of the present invention it is further assumed that only six colors are used while in the above mentioned application of Toulmin, it is mentioned that up to 15 colors are usable for such purpose.

These colors may be purple-violet, blue, green, yellow, orange and red.

One complete pattern in one frame is denoted with reference numeral 10′, another frame is denoted with 10″. As it can be seen, the colors of these patterns are different, and the combination of colors as present in the various dots patterns is also different.

The colors are to be understood in this instance that a light source illuminating the strip from one side thereof is modified by the dots so that the dots appear visible as having any of the above mentioned colors.

Turning now to FIG. 2 there is shown a table 20 having a window 21 below which is positioned a light source 22. Over the table 20 runs the film strip 10 and during the passing over the window 21 the light will illuminate the film strip and pass therethrough producing an image of the colored dots which are present momentarily in the window.

In the light path of the light source 22 are first positioned two mirrors 23 and 24 of the dichroic type, which mirrors are color selectively semi-transparent. Dichroic reflectors of this type are known in the art, and they divide the light coming from the window 21 into three more or less monochromatic portions. With the aid of two conventional mirrors 25 and 26, there are now altogether defined three light paths 31, 32 and 33, each one being a monochromatic picture of what is visible in the window 21.

Each one of these monochromatic light channels 31, 32 and 33 contains nine photocells which are arranged in a square and they are spaced precisely as the color dots are spaced from each other in the patterns 10′ and 10″ in FIG. 1. Therefor, there are altogether twenty-seven photocells for monitoring the color of the nine dots.

Turning now to FIG. 3 reference is first made to three units 41, 42 and 43 which are banks of photo-electric amplifiers, each bank comprising three photocells and three gated amplifiers which will be explained later. At the present it is sufficient to mention that these three banks of photo-electric amplifiers 41, 42 and 43 are effective in one channel, for example in channel 31, and they are sensitive to whatever light passes into this red channel 31; or, in other words they are sensitive to the red component of the image appearing in the window 21. It will be appreciated that the bank 41 is to monitor column 1, and its three output channels 41A, 41B and 41C are responsive to absence or presence of red in the individual dots in row 1 being identified in FIG. 1 as having A1, B1, and C1 positions. Accordingly, the bank 42 is responsive, still within the red color channel, for absence or pressure of red in the dots in row or column 2, and this bank particularly monitors the red component of the dots in the A2, B2 and C2 position. Finally, the three channels 43A, 43B and 43C serve accordingly to monitor the red component of the dots A3, B3 and C3 of column 3.

It will be comprehended, that the photocells of banks 41, 42 and 43 are arranged to match the patterns of the frames such as 10′ and 10″.

In the next channel, 32, which may for example be "blue" channel, there are three banks of photo-electric amplifiers 51, 52 and 53, also comprised of altogether nine photo-electric cells with gated amplifiers arranged so as to monitor the blue components of the picture whatever appears in the window 21. It will be appreciated that the channels, for example 51A, is to monitor the blue component of dot A1. The other channels operate accordingly. The photocells of the blue channels are also located in the pattern of frames 10' or 10''.

Finally, there is a third color channel 33 which is responsive to the yellow component and there are also provided three banks, 61, 62 and 63, of photocells-amplifiers, each bank having also three photocells and gated amplifiers and all nine photocells are together responsive to the yellow component of any complete pattern. The photocells in any of the three banks are also arranged in a geometric configuration, similar to the arrangement of the other banks. Particularly, the output channel of bank 61, denoted 61A, is responsive to the yellow component of the dot A1, etc.

From the foregoing, it will be apparent that the output channels 41A, 51A and 61A are all monitoring the color components of dot at location A1. Turning now to the particular inventive feature of this application, reference is made to FIG. 4 which, as stated above, illustrates a detail of FIG. 3, particularly the dotted area thereof. There is shown the bank of photocells 43 which are to monitor the red component of the dots A3, B3 and C3. There are provided three photocells 431, 432 and 433 for these three dots, respectively. Each photocell produces an output which is amplified by amplifiers 434, 435 and 436, respectively. Turning now to the photocell-amplifier arrangement 431–434, its output is first fed through a pulse shaper 46, producing rectangular waves whenever a red, violet or orange dot passes under its photocell 431 and energizes it sufficiently.

Taking FIGS. 1, 2 and 4 together it will be appreciated that when the film strip 10 runs across the window 21 the photocell for example 431 is actuated by whatever red light is permitted to pass into channel 31. This red light, reaching cell 431, considered as appearing in time sequence, is composed of the light from all dots of line A; amplifier 434 will respond in succession to the electric signals resulting from the light reaching photocell 431 which light has been color modulated by the dots identified by A1, A2 and A3. Also the space between these dots and between the various patterns passes across the range of vision of this photocell 431.

The purpose of this photocell 431 and its amplifier 434, is to provide a gating signal so that the entire remaining detector circuit i.e. all other twenty-eight detector channels, will be responsive to any signal only if the associated dots are in their range of detection. In particular, the photocell 431 and its output amplifier 434 shall gate-open all other detector channels when its associated dot which is A3, is in its range of detection. It has to be considered that two dots i.e. A2 and A1 of the same frame will always pass under photocell 431 before it is to provide its gating action; each dot produces a pulse in amplifier 434. At this instant it should be mentioned that for proper action, all dots of line A are to be red or have to have a red component. This is only a slight limitation as to the number of available color combinations.

There is provided a ring counter 44 to which is fed the output of amplifier 434 via a pulse shaper 46. Ring counters and pulse shapers are well known in the art and need uo further explanation. In the instant case a 3-element-ring counter is employed. The output of the third element is taken from an output line 47, and it appears that with three pulses fed from pulse shaper 46 into the ring center 41 only, always the third one appears into output line 47.

It is apparent from the foregoing that in the direction of motion of the film strip 10 as indicated by the arrow in FIG. 1, there always will be under the photocell 431 first the dot A1 whereby in photocell 431 and its amplifier 434 a pulse is produced to start the ring counter 44; then another pulse is produced in detector channels 431–434 when the dot A2 passes under photocell 431 and ring counter 44 is shifted to a second stage. Finally dot A3 passes under photocell 431, and ring counter is shifted to its third stage accordingly; simultaneously an output pulse is produced in line 47, the effect of which is to be explained in the following.

It will be comprehended now, that ring counter 44 can be omitted and the output pulse of pulse shaper 46 be used directly for gating hereinafter to be described in general, if dots in the A1 and A2 position are never red.

If a dot in A1 or in the A2 position is never red, the ring counter will be a two-stage counter only.

There is provided a master gate for which is employed a logic "and" circuit 439, to which master gate or logic "and" circuit 439 is fed also the output of pulse shaper 436 as well as the output of the ring counter as appearing in line 47. Accordingly, "and" circuit 439 produces an output signal only whenever dot A3 is under photocell 431. This output of "and" circuit 439 is fed first to an "and" circuit, 437, which in this case also operates as a gating circuit for amplifier 435. "And" circuit 437 has two input terminals, one of which being connected to the output terminal of "and" circuit 439, the other input terminal being the output terminal of photocell 432. The output of "and" circuit 437 is fed into the amplifier 435 producing an output for a terminal 43B.

There is another "and" circuit, 438, which has also two input terminals, one of which being connected to the output terminal of "and" circuit 439, while the other input terimnal of "and" circuit 438 is connected to the output terminal of photocell 433. The output of "and" circuit 438 is fed to the control element of an amplifier 436, the output of which being connected to a terminal 43A. The output of "and" circuit 439 finally serves also as an output for the photocell 431 and is then fed to a third output terminal, 43C, of this bank 43.

Thus, the three terminals 43A, 43B and 43C determine the presence of "red" in the dots of the third row.

The circuit encircled by the dashed line in FIG. 4 is comprised by a photocell 433, a photo-electric amplifier 436, and an "and" circuit 438 with two input terminals, one of which being supplied by the output of the photocell 433 while the other one being supplied with gating pulses; this circuit network can be considered as the basic photo-electric gated amplifier unit.

There are altogether used 26 of these units in the embodiment shown in FIG. 3 i.e. each bank 41, 42, 51, 52, 53, 61, 62 and 63 can be considered as being comprised of three of such basic photocells-amplifier-gate-units.

Of course, amplifier 436 and gate circuit 438 can be substituted by gated amplifiers of known design.

The output of ring counter 44, i.e. the pulses appearing in line 47 are also fed to a terminal 45 which terminal is to be connected to all gating input circuits of all other units in the banks other than 43.

From this description it will be apparent that the entire device is activated i.e. gated open for detection only when dot A3 actually is in the detecting range of photocell 431; in this case, all the other dots of that particular frame pattern are precisely under the associated photocells, and at that moment gating action is provided and the color content of all the dots is monitored.

Turning back to FIG. 3 there is additionally illustrated the selective recognition circuit network for the dot A1. There is a selector switch 70 which provides for a matching circuit for the output as produced by all those photocells which monitor the color content of dot A1. Thus, the position of this selector switch 70 is matched against the output of channels 41A, 51A and 61A. This is carried in the following manner.

There are altogether six contact terminals (selector positions) circularly arranged so as to be contacted by a rotary contact glider arm 80. These stationary contacts are denoted with reference numerals 71, 72, 73, 74, 75 and 76. The contacts 71, 72 and 73 are connected to the output channels 41A, 51A and 61A respectively via blocking gates 71', 72', 73', respectively. These blocking gates will be explained later in connection with FIG. 3*a*.

The contact terminal 74 is connected to channels 51A and 61A via an "and" circuit 77. The contact terminal 75 is connected to the channels 41A and 51A via an "and" circuit 78, and the contact terminal 76 is connected to the channels 41A and 61A via an "and" circuit 79.

It will be appreciated that whenever the color of dot A1 is red, a pulse is supplied to terminals 71; if the dot is blue a pulse will be supplied to terminal 72; if the dot is yellow a pulse is supplied to terminal 73.

However, for example, if the dot is purely red, there is also a pulse supplied to one input of an "and" circuit 79 but no pulse is supplied to the other input of the "and" circuit 79 because the channel 61A, responsive to the yellow component of this dot, will remain unenergized in this case.

If the dot is green, output pulses will appear in channels 51A and 61A because in this case there is a blue and a yellow component present in the chromatic composition of this dot. In this case, there will appear pulses in both the input terminals of "and" circuit 77, and therefore an output is produced in terminal 74.

Also if the dot is orange, the "and" circuit 79 receives a "yellow" and a "red" pulse from channels 61A and 41A, respectively, and produces an output pulse energizing terminal 76; finally, if the dot is purple-violet, the "and" circuit 78 produces an output pulse for terminal 75 after having received a "red" and a "blue" pulse.

The "and" circuits connected to terminals 74, 75 and 76 distinguish between the monochromatic colors of the color channels 31, 32 and 33 per se and mixed colors thereof.

The circuit described thus far, however, would have a deficiency in case a dot is of a mixed color as defined, because then two of the terminals 71, 72 and 73, being associated with the colors red, blue and yellow, respectively will also be energized in this rotary switch 70. The blocking gates 71', 72', and 73' are to avoid this.

The network in the 71' is illustrated in FIG. 3A and it is comprised first by the input line 41A and connection lines to terminals 75 and 76. There is first provided an "and" circuit 83 having two input terminals. One input terminal is connected to the channel 41A, the other input terminal is connected to the output of an inverter stage of known type 84 being supplied with the output signal of logic "or" circuit which is denoted with reference numeral 85. The input terminals of logic "or" circuit 85 are connected by lines 75' and 76' to the two channels for terminals 75 and 76, respectively.

The operation thereof will be described in the following. Suppose the dot under observation has a red component, then there will be of course a pulse appearing channel 41A. If this dot is pure red, no output is produced by the "and" circuits 79 and 78 because none of the other channels 51A and 61A carries a pulse. Accordingly, the "or" circuit 85 produces no output. The inverter stage 84 consequently produces an output and logic "and" circuit 83 with its two inputs produces also an output for terminal 71 which is proper in case of a pure red.

Suppose the dot is orange, then again a pulse appears in channel 41A, but also in channel 61A. This means that logic "and" circuit 79 produces an output pulse which is fed first to the terminal 76 being associated with orange, but the pulse is also fed logic "or" circuit 85 via line 76' and the inverter stage 84 produces no output which in turn keeps logic "and" circuit 83 closed. Thus, the appearance of a red pulse for the other input of "and" circuit 83 is not effective and no output is produced by this logic "and" circuit and therefore, in this case, even though there is a red component present, no pulse appears at terminal 71.

It will be appreciated, how the circuit networks 72' and 73' are designed. They also include a logic "and" circuit with one input connected to channels 51A and 61A, respectively. The other input of the respective "and" circuit is provided by the output of an inverter stage which is fed from an "or" circuit being connected with its respective input terminals to those terminals in which this particular color appears as mixed color. Thus, blocking gate 72' has an "or" circuit connected to terminals 74 and 75 via lines 74' and 75'', respectively, while blocking gate 73' has an "or" circuit connected to terminals 74 and 76 via lines 74'' and 76'', respectively.

Consequently, terminals 71, 72 or 73 will only be energized if the dot A1 is purely red, purely blue or purely yellow.

It will now be appreciated that with the employment of this circuit network as described thus far, pulses or signals appear in any of the terminals 71 to 76 in accordance with the color of the dot A1 under observation. There is provided, as stated, a selector switch arm 80 which may make contact with any of the stationary terminals 71 thru 76. Whenever the arm 80 makes contact with the terminal at which appears an output pulse from the monitoring device for the dot A1, the pulse will be guided into line 81. This line 81 runs to one of three input terminals for a logic "and" circuit 91. The other inputs of logic "and" circuit 83 are provided by lines of similar selector switches such as 70 but being associated with dots B1 and C1. It will be apparent that logic "and" circuit 91 will produce an output whenever the dots A1, B1 and C1 have the color as selected by a particular position of the selector switches such as 70 associated with dot A1.

It will therefore be comprehended that the logic "and" circuit 91 produces an output when the selected color combination for the dots in the first row matches those which are observed. In other words, the logic "and" circuit 91 produces an output when dots A1, B1 and C1 have their preselected color.

There is provided another logic "and" circuit 100 with three input terminals, one input terminal is the output of logic "and" circuit 91 which observes the dots of the first row. Logic "and" circuits 92 and 93 are corresponding logic "and" circuits which produce output pulses, whenever the dots in the third and the second row, respectively, match those preselected by the associated selector switches for the dots in the second and third row. It was said above, that there are altogether nine selector switches such as 70, each one producing an output whenever the selected dot matches the one under observation. It will therefore be observed that the logic "and" circuit 100 produces an output whenever all dots have their preselected colors. The output of logic "and" circuit 100 can be used in a manner known per se for example to stop the advancing mechanism 10 of tape, or for activating an identifying mechanism marking the particular spot on the tape, or merely for signaling the presence of an observed complete read-out i.e. the observation of a complete combination as selected by all the selector switches together.

The invention is not limited to the embodiments described above, but all changes and modifications thereof not constituting departments from the spirit and scope of the invention are intended to be covered by the following claims.

What I claim is:

1. An input device for data processing systems comprising: a continuously moving carrier for encoded information defined by similarly shaped patterns of colored dots thereon, the colors thereof being selected from a group of predetermined colors; a first permanently enabled light sensitive means scanning the extension of each pattern in the direction of carrier movement and being responisve to light reflection and occurrence from one particular dot of each pattern; second, normally disabled light sensitive means detecting the color of the other dots of the same pattern; a logic "and" circuit network connected to said first and said second light sensitive means and governing the responsiveness of said second light sensitive means by enabling it in dependence upon an output produced by said first light sensitive menas; means for producing an output signal when the color of one dot corresponds to a preselected color; and a coincidence network including a plurality of logic "and" circuits.

2. In an input device for data processing systems the combination comprising: a carrier for encoded information defined by patterns of colored dots thereon, the colors thereof being selected from a group including six predetermined colors; a plurality of photoelectric detector means including one permanently enabled photoelectric detector means while the remaining photoelectric detector means are normally disabled, said plurality of photoelectric detector means being arranged so that when enabled they all simultaneously and individually monitor the colors of all the dots of a pattern, there being as many detector means as there are dots in a pattern; each photoelectric detector means having three channels respectively responsive to three color components in the light from one particular dot of each pattern; circuit means including said one permanently enabled photoelectric detector means for sensing the extension of a dot pattern in the direction of carrier movement and producing an enabling signal only when the dot of a pattern assigned for being monitored by said permanently enabled photoelectric detector means is in its detecting range; means for feeding said enabling signal to all of said remaining photoelectric detector means; a circuit network for said detector and including a six position selector switch, further including three logic "and" circuits each having two input terminals and one output terminal connected to one of said positions, said input terminals being connected to two different color channels with each color channel being connected to two input terminals pertaining to two different "and" circuits, three normally open gates respectively and individually connecting each color channels to three other positions of said switch, a logic "or" circuit for each of said gates connected for closing the gate and having two input terminals connected to the output terminals of those "and" circuits having input terminals connected to that one of the color channels also being connected to the gate to which the "or" circuit pertains, said selector switch further including a selector arm selectively and individulaly connected to any one of said positions.

3. In an input circuit for a data processing system, wherein information is represented as similarly shaped patterns of colored dots, with the color of any dot being selected from a plurality of colors, the combination comprising: a plurality of photoelectric detector means including one permanently enabled photoelectric detector means while the remaining photoelectric detector means are normally disabled, said plurality of photoelectric detector means being arranged so that when enabled they all simultaneously and individually monitor the colors of all the dots of a pattern, there being as many detector means as there are dots in a pattern; each photoelectric detector means including three channels individually responsive to three basic colors from a dot; circuit means including said one permanently enabled photoelectric detector means for sensing the extension of a dot pattern in the direction of carrier movement and producing an enabling signal only when the dot of a pattern assigned for being monitored by said permanently enabled photoelectric detector means is in its detecting range; means for feeding said enabling signal to all of said remaining photoelectric detector means; a selector switch having a plurality of operating positions; a logic "and" circuit having its output connected to one of said positions and having two input terminals, connected to a first and second one of said channels; a second logic "and" circuit, having its output connected to a second one of said positions, and having two input terminals connected to the first and the third one of said channels; a gate with input, output and gate terminal, having the input terminal connected to said first channel and the output terminal connected to a third selector position; a logic "or" connected to said gate terminal and having two input terminals individually connected to the output terminals of said two "and" circuits; and means for selectively enabling any of said positions for permitting passage of a pulse representing a selected color.

4. An input device for data processing systems comprising: a continuously moving carrier for encoded information defined by similar shaped patterns of colored dots thereon, the colors thereof being selected from a group of predetermined colors; a plurality of photoelectric detector means including one permanently enabled photoelectric detector means while the remaining photoelectric detector means are normally disabled, said plurality of photoelectric detector means being arranged so that when enabled they all simultaneously and individually monitor the colors of all the dots of a pattern, there being as many detector means as there are dots in a pattern; circuit means including said one permanently enabled photoelectric detector means for sensing the extension of a dot pattern in the direction of carrier movement and producing an enabling signal only when the dot of a pattern assigned for being monitored by said permanently enabled photoelectric detector means is in its detecting range; means for feeding said enabling signal to all of said remaining photoelectric detector means; and means for combining the outputs of all said photoelectric detector means when enabled.

5. An input device for data processing systems comprising: a continuously moving carrier for encoded information defined by similar shaped patterns of colored dots thereon, the colors thereof being selected from a group of predetermined colors; a plurality of photoelectric detector means including one permanently enabled photoelectric detector means while the remaining photoelectric detector means are normally disabled, said plurality of photoelectric detector means being arranged so that when enabled they simultaneously and individually monitor the colors of the dots of a pattern, there being as many photoelectric detector means as there are dots in a pattern, discriminating means connected to said one photoelectric detector means to distinguish between signals produced in said one detector means by dots other than the one to be monitored by said one detector means, and the signal resulting from the monitoring of that one dot; means connected to said discriminating means for feeding an enabling signal to said remaining photoelectric detector means when said one dot is monitored by said one detector means; and means for combining the outputs of all said photoelectric detector means when enabled.

References Cited by the Examiner

UNITED STATES PATENTS

| | | | |
|---|---|---|---|
| 2,196,166 | 4/40 | Bryce | 250—226 |
| 2,548,783 | 4/51 | Goldsmith | 250—226 |
| 2,742,631 | 4/56 | Rajchman | 250—71 |
| 2,747,797 | 5/56 | Beaumont | 250—208 |
| 2,863,939 | 12/58 | Jones | 250—226 |
| 2,885,564 | 5/59 | Marshall. | |
| 2,899,132 | 8/59 | Orthuber | 250—226 |
| 3,050,633 | 8/62 | Loebner | 250—209 |

RALPH G. NILSON, *Primary Examiner.*

RICHARD M. WOOD, *Examiner.*